(12) United States Patent
Samoto et al.

(10) Patent No.: US 6,920,805 B2
(45) Date of Patent: Jul. 26, 2005

(54) THROTTLE-OPENING DETECTING APPARATUS

(75) Inventors: Haruhiko Samoto, Shizuoka (JP); Norio Hayashi, Shizuoka (JP); Michiyuki Suzuki, Shizuoka (JP); Masahiro Kawamura, Shizuoka (JP)

(73) Assignees: Yamaha Hatsudoki Kabushiki Kaisha, Shizuoka-ken (JP); Asahi Denso Co., Ltd., Shizuoka (JP)

( * ) Notice: Subject to any disclaimer, the term of this patent is extended or adjusted under 35 U.S.C. 154(b) by 127 days.

(21) Appl. No.: 10/370,520

(22) Filed: Feb. 24, 2003

(65) Prior Publication Data

US 2003/0172763 A1 Sep. 18, 2003

(30) Foreign Application Priority Data

Feb. 26, 2002 (JP) .................................... P. 2002-049755

(51) Int. Cl.$^7$ .............................................. B60K 23/04
(52) U.S. Cl. ........................... 74/485; 74/491; 74/551.9
(58) Field of Search ............................... 74/484 R, 485, 74/486, 487, 488, 489, 491, 551.8, 551.9

(56) References Cited

U.S. PATENT DOCUMENTS

| | | | | |
|---|---|---|---|---|
| 4,545,455 A | * | 10/1985 | Kanemura et al. | 180/197 |
| 4,848,502 A | * | 7/1989 | Kikuta et al. | 180/179 |
| 4,898,137 A | * | 2/1990 | Fujita et al. | 123/352 |
| 4,932,375 A | * | 6/1990 | Burney | 123/361 |
| 5,907,976 A | * | 6/1999 | Santoro et al. | 74/491 |
| 6,135,227 A | * | 10/2000 | Laning | 180/170 |
| 6,144,125 A | * | 11/2000 | Birkestrand et al. | 310/68 B |
| 6,276,230 B1 | | 8/2001 | Crum et al. | |

FOREIGN PATENT DOCUMENTS

| | | | |
|---|---|---|---|
| DE | 36 01 921 A | | 7/1987 |
| JP | 4-254278 A | | 9/1992 |
| JP | 4-254278 | * | 9/1992 |
| JP | 7-324639 | * | 12/1995 |
| JP | 10-227219 | * | 8/1998 |
| JP | 2002-745492 | * | 9/2002 |
| JP | 2003-411165 | * | 5/2003 |

OTHER PUBLICATIONS

Patent Abstracts of Japan; vol. 017, No. 031 (M1356), Jan. 21, 1993 & JP 04 254278 A (Yamaha Motor Co Ltd), Sep. 9, 1992.

Patent Abstracts of Japan; vol. 1995, No. 03, Apr. 28, 1995 & JP 06 344968 A (Suzuki Motor Corp), Dec. 20, 1994.

* cited by examiner

*Primary Examiner*—William C Joyce
(74) *Attorney, Agent, or Firm*—Sughrue Mion, PLLC

(57) ABSTRACT

A throttle-opening detecting apparatus has a case mounted on a handle bar of a vehicle, a throttle grip mounted on a leading end side of the handle bar from the case so as to be rotatable with respect to the handle bar, a detect member incorporated in the case and rotatable in linking with the throttle grip, a throttle-opening sensor for detecting the rotation angle of the detect member, and a rotative direction changing unit for rotating the detect member in a direction substantially perpendicular to the rotative direction of the throttle grip, so as to provide a throttle-opening detecting apparatus which can decrease the thickness-direction dimension of the case to thereby reduce the size of the throttle-opening detecting apparatus.

4 Claims, 5 Drawing Sheets

THROTTLE-OPENING DETECTING APPARATUS

BACKGROUND OF THE INVENTION

1. Field of the Invention

The present invention relates to a throttle-opening detecting apparatus which detects the rotation angle of a throttle grip mounted on a handle bar used in a vehicle such as a two-wheeled vehicle to thereby detect the throttle-opening.

2. Description of the Related Art

A throttle-opening detecting apparatus for use in a two-wheeled vehicle is structured such that it detects the rotation angle of a throttle grip mounted on a handle bar and transmits its detect signal to an electronic control unit carried on board the two-wheeled vehicle; and, in accordance with the detect signal, the electronic control unit executes a given operation and, based on the operation result of the electronic control unit, the ignition timing of an engine as well as the opening and closing of an exhaust valve can be controlled.

Conventionally, a throttle-opening detecting apparatus, for example, as disclosed in JP-A-4-254278, comprises mainly a drive pulley worked with a throttle grip and rotatable in the same direction as the throttle grip, a drive gear disposed in the lower portion of the drive pulley, a detecting gear rotatable in meshing engagement with the drive gear, and a potentiometer for detecting the rotation angle of the detecting gear; and, these drive pulley, drive gear, detecting gear and potentiometer are respectively incorporated in a case which is fixed to the handle bar.

According to the above structure, in case where the throttle grip is rotated, the drive pulley is worked with the rotative direction of the throttle grip and, at the same time, the detecting gear in meshing engagement with the drive gear disposed in the lower portion of the drive pulley is also rotated. The rotation angle of the detecting gear is detected by the potentiometer to thereby detect the rotation angle of the throttle grip, that is, the throttle-opening. Such rotation of the detecting gear is executed about an axis extending substantially in parallel to the extension direction of the handle bar, and the angle of such rotation is detected by the potentiometer.

However, in the above-mentioned conventional throttle-opening detecting apparatus, since the rotation of the detecting gear is executed about an axis extending substantially in parallel to the extension direction of the handle bar, in order to allow the shifting motion of the detecting gear caused by the rotational movement of the detecting gear, the case must be increased in thickness. That is, in order to prevent the detecting gear from interfering with the case while the detecting gear is rotating, the dimension of the case in the direction where it is expanded from the handle bar must be set large, which unfavorably results in the large-sized outer shape of the throttle-opening detecting apparatus.

SUMMARY OF THE INVENTION

The present invention aims at eliminating the above drawbacks found in the above-mentioned conventional throttle-opening detecting apparatus. Accordingly, it is an object of the present invention to provide a throttle-opening detecting apparatus which can decrease the thickness-direction dimension of the case to thereby reduce the size of the throttle-opening detecting apparatus.

According to the present invention as set forth in a first aspect, there is provided a throttle-opening detecting apparatus having a case mounted on a handle bar of a vehicle, a throttle grip mounted on a leading end side of the handle bar from the case so as to be rotatable with respect to the handle bar, a detect member incorporated in the case and rotatable in linking with the throttle grip, a throttle-opening sensor for detecting the rotation angle of the detect member, and a rotative direction changing unit for rotating the detect member in a direction substantially perpendicular to the rotative direction of the throttle grip.

According to the above structure, in case where the throttle grip is rotated, the rotative direction changing unit rotates the detect member in a direction substantially perpendicular to the rotative direction of the throttle grip. Therefore, in case where the throttle-opening sensor detects the rotation angle of the detect member, the rotation angle of the throttle grip can be recognized.

According to the present invention as set forth in the second aspect, in a throttle-opening detecting apparatus as set forth in the first aspect, wherein the case includes two half-divided cases, the two half-divided cases being respectively mounted onto the handle bar from an upper and a lower directions of the apparatus so as to hold the handle bar therebetween.

According to the present invention as set forth in a third aspect, in a throttle-opening detecting apparatus as set forth in the first or second aspect, wherein the throttle-opening sensor is mounted on the upper side of the case.

DETAILED DESCRIPTION OF THE PREFERRED EMBODIMENTS

Now, description will be given below in detail of an embodiment of a throttle-opening detecting apparatus according to the present invention with reference to the accompanying drawings.

Figure 1:
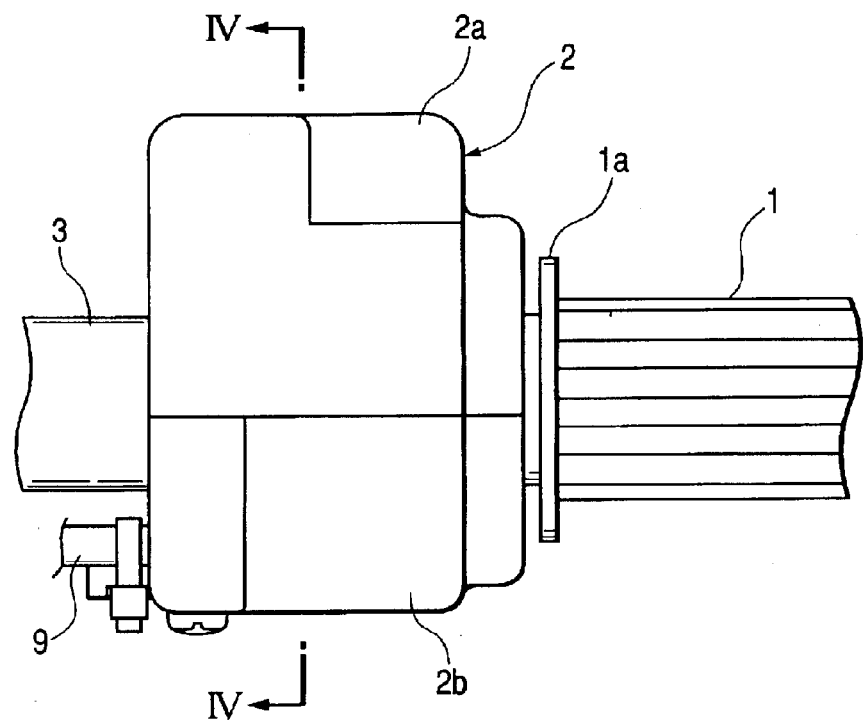
FIG. 1 is a front view of a throttle-opening detecting apparatus according to an embodiment of the present invention.
Figure 2:
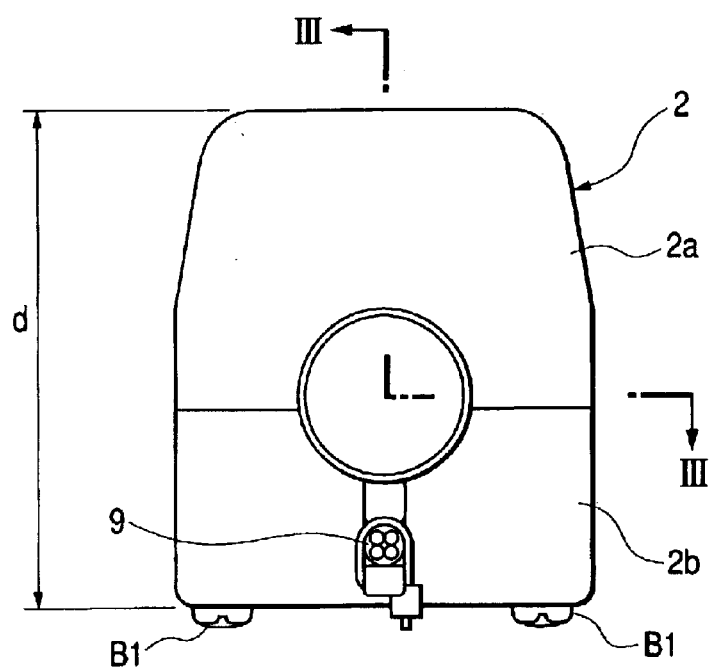
FIG. 2 is a left side view of a throttle-opening detecting apparatus according to the embodiment of the present invention.

A throttle-opening detecting apparatus according to the present embodiment is structured such that it detects the rotation angle of a throttle grip mounted on a handle bar provided in a two-wheeled vehicle and transmits its detect signal to an electronic control unit such as ECU carried on board the two-wheeled vehicle; and, the present throttle-opening detecting apparatus has such an outer shape as shown in FIGS. 1 and 2. In these figures, a throttle grip 1 is rotatably mounted on the leading end of the right handle bar of the two-wheeled vehicle and, to the base end side (in FIG. 1, the left end side) of the throttle grip 1, there is fixed a case 2 made of resin.

Figure 4:
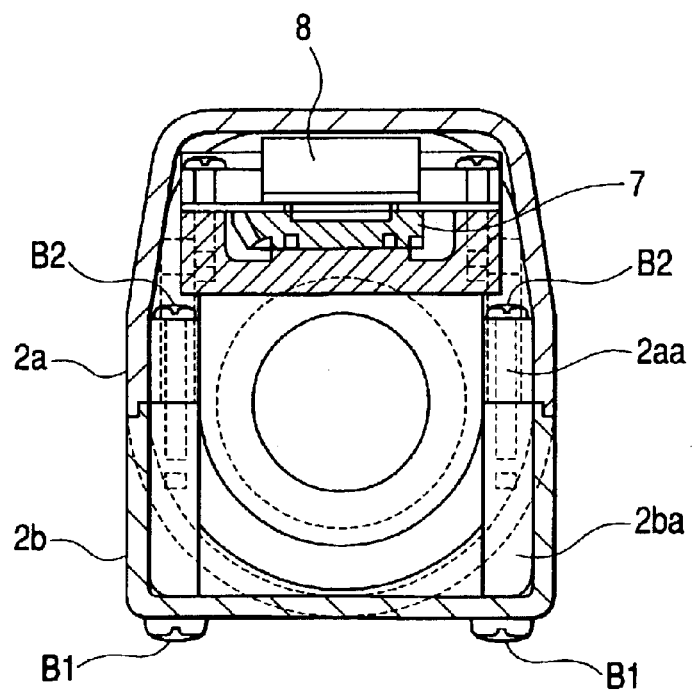
FIG. 4 is a section view taken along the line VI—VI shown in FIG. 1.

The case 2 includes two half-divided upper and lower cases 2a and 2b; and, the case 2 can be assembled to a handle bar 3, while holding the handle bar 3 between the two upper and lower cases 2a and 2b. The upper and lower cases 2a and 2b, as shown in FIG. 4, are fixed to each other by inserting and threadedly engaging a pair of screws B1 and B2 into the upper and lower cases 2a and 2b. By the way, in FIG. 4, reference characters 2ba and 2aa respectively designate bosses which are formed in the upper and lower cases 2a and 2b; and, the screws B1 can be inserted and engaged into the bosses 2ba and 2aa. Also, although not shown, there are separately formed bosses into which the screws B2 can be inserted and engaged.

Figure 3:
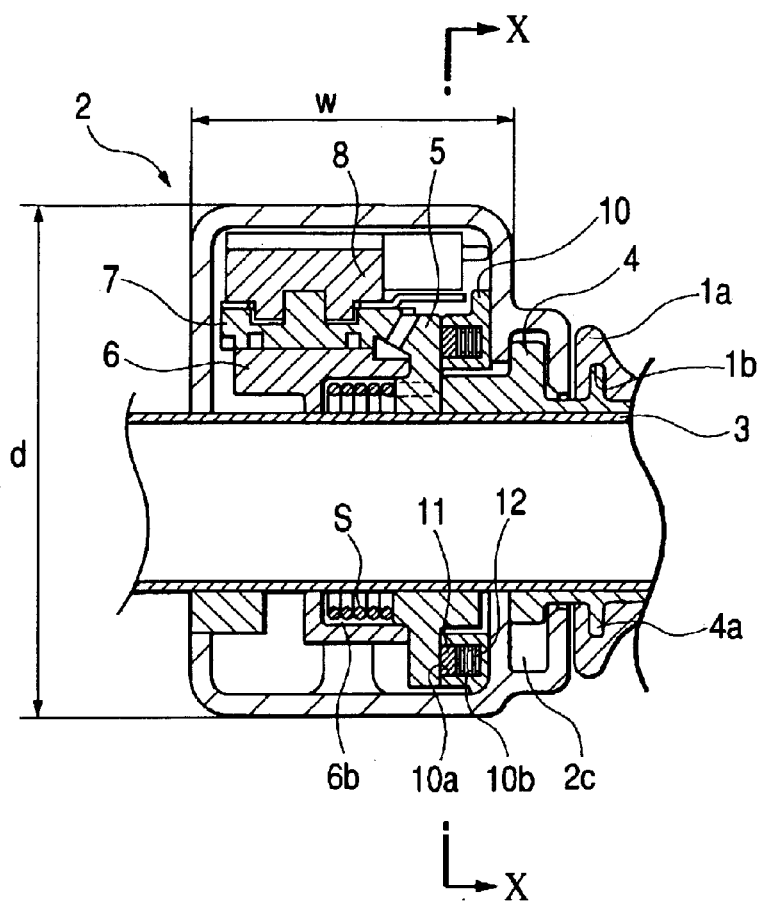
FIG. 3 is a section view taken along the line III—III shown in FIG. 2.

The throttle grip 1 constitutes an accelerator structured such that, in case where it is coaxially rotated with respect to the handle bar 3, it can obtain an arbitrary engine output; and, on the base end side of the throttle grip 1, there is disposed a flange portion 1a which projects in a direction substantially perpendicular to the extension direction of the handle bar 3. In the inner peripheral surface of the flange portion 1a, as shown in FIG. 3, there are formed a pair of upper and lower slits 1b.

Figure 8:
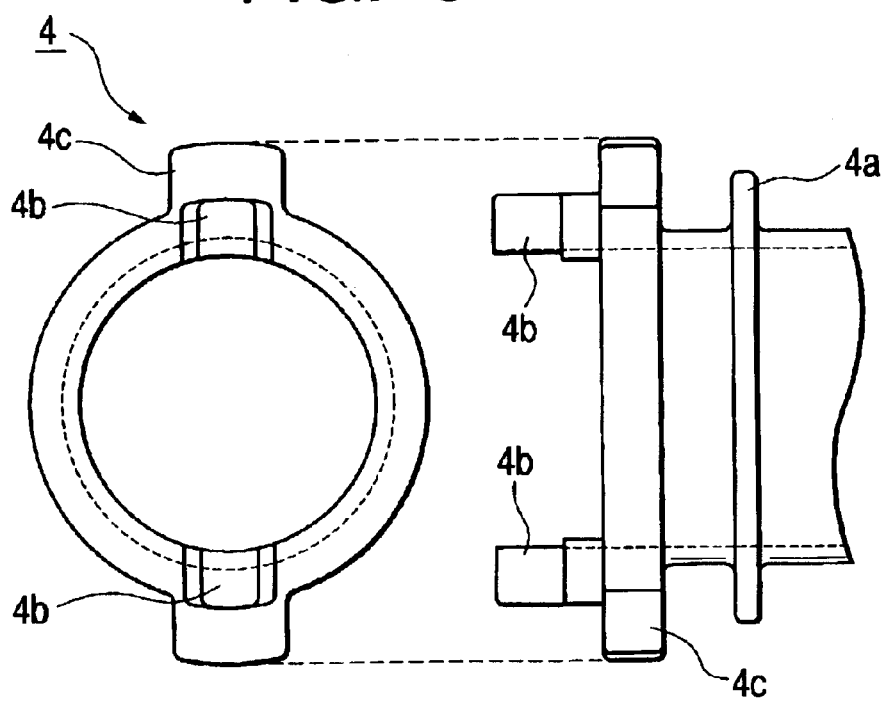
FIG. 8 is a left side view of the left end side of a tube guide used in a throttle-opening detecting apparatus according to the embodiment of the present invention, and a front view thereof.

A tube guide 4 is interposed between the throttle grip 1 and handle bar 3 and is structured such that it can be rotated together with the throttle grip 1 to thereby transmit its rotational movement to a drive gear 5 which will be discussed later. The tube guide 4, as shown in FIG. 8, includes a projecting portion 4a which can be fitted into and secured to the pair of slits 1b of the throttle grip 1; and, in the base end (in FIG. 3, the left end) of the tube guide 4, there are formed a pair of leg portions 4b which respectively project toward the drive gear 5.

The leg portions 4b of the tube guide 4 are structured such that they can be fitted with and secured to the right end face of the drive gear 5 and, in case where the throttle grip 1 is rotated with respect to the handle bar 3, the leg portions 4b can rotate the drive gear 5 through the tube guide 4. By the way, on the base end of the tube guide 4, there are formed two flange portions 4c which respectively project in the upward and downward directions; and, in the case 2, there are formed two storage portions 2c which are respectively used to store their associated flange portions 4c therein.

Figure 9:
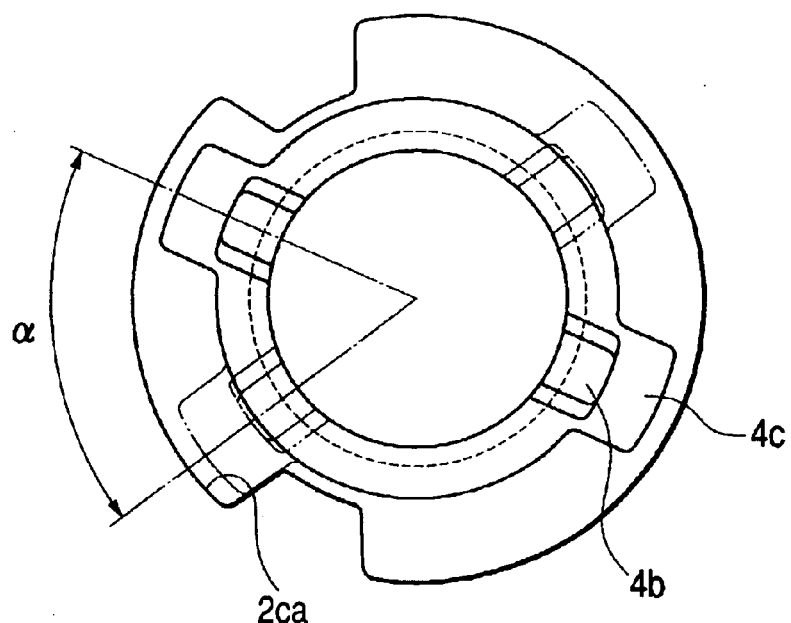
FIG. 9 is a typical view of the rotation area of a tube guide used in a throttle-opening detecting apparatus according to the embodiment of the present invention; and, FIG. 10 is a section view taken along the arrow line X—X shown in FIG. 3.

Each of the storage portions 2c is formed in such a shape as shown in FIG. 9 and, in part of the inner peripheral surface of the storage portion 2c, there is formed a recessed portion 2ca which is used to restrict the shift range of one flange portion 4c. That is, one flange portion 4c is allowed to shift only within the recessed portion 2ca, which restricts the rotation angle of the throttle grip 1 to a given range. By the way, the operation angle α of the throttle grip 1 according to the present embodiment is set as an angle of about 60° and, in addition to this, there is set a play angle of about 10°.

Figure 5:
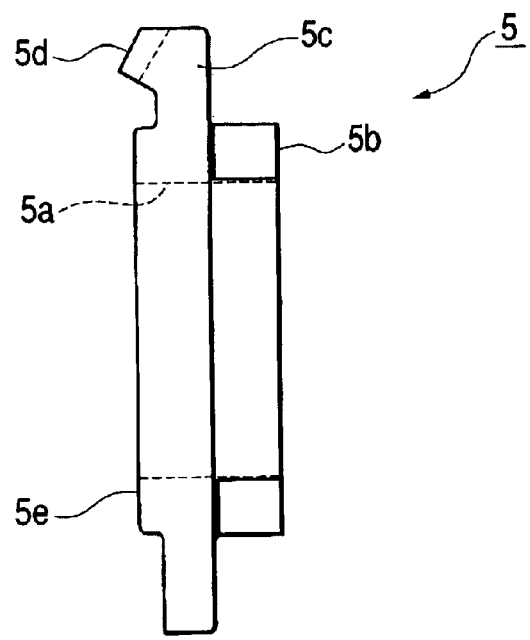
FIG. 5 is a front view of a drive gear used in a throttle-opening detecting apparatus according to the embodiment of the present invention.
Figure 6:
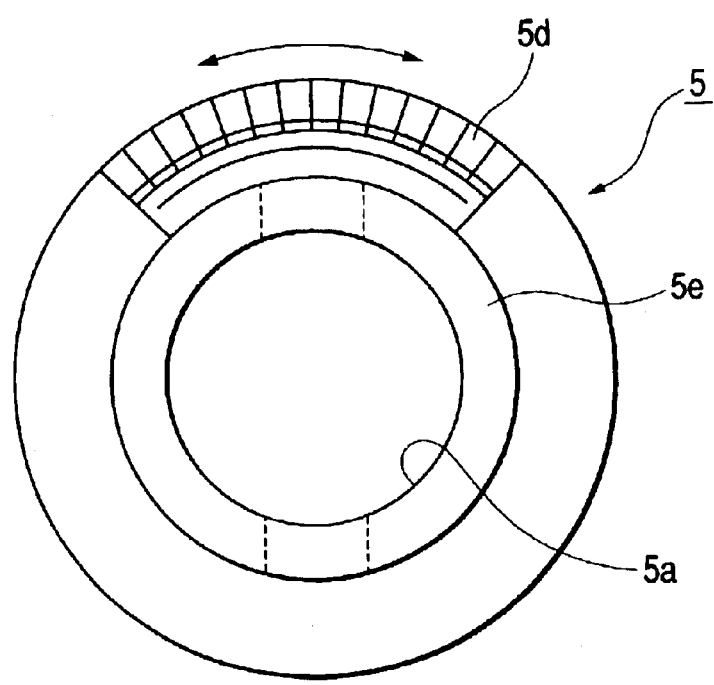
FIG. 6 is a left side view of a drive gear used in a throttle-opening detecting apparatus according to the embodiment of the present invention.

The drive gear 5 is made of a resin molding. Specifically, as shown in FIG. 5, it includes, substantially in the central portion thereof, an insertion hole 5a through which the handle bar 3 can be inserted; and, it further includes a fitting portion 5b formed in the right end face thereof for fit with the tube guide 4, and a projecting portion 5c which projects upwardly, while the fitting portion 5b and projecting portion 5c are formed as an integral body. In the leading end of the projecting portion 5c, as shown in FIG. 6, there is formed a teeth portion (bevel gear) 5d which is inclined at a given angle; and, as the drive gear 5 is rotated, the teeth portion 5d is shifted in the arrow mark direction in FIG. 6.

That is, the drive gear 5 is structured such that since, in case where the throttle grip 1 is rotated, the rotation power of the throttle grip 1 is transmitted to the drive gear 5, the drive gear 5 can be rotated in the same direction of the throttle grip 1 in linking with the rotative direction of the throttle grip 1. By the way, in the opposite surface of the drive gear 5 to the fitting portion 5b thereof, there is formed an expanded portion 5e which is expanded by a given dimension; and, the expanded portion 5e cooperates together with a recessed portion 6b formed in a storage member 6 (which will be discussed below) in forming a space for storing a return spring S therein.

On the other hand, in FIG. 3, on the left side of the drive gear 5, the storage member 6 including the recessed portion 6b is fixed to the interior of the case 2 with the handle bar 3 inserted therethrough and, in the space defined by the recessed portion 6b and the above-mentioned expanded portion 5e, there is stored the return spring S. The return spring S includes a torsion spring one end of which is fixed to the storage member 6 and the other end of which is fixed to the drive gear 5. And, in case where a driver takes off (loosens) hands from the throttle grip 1 which has been rotated, the return spring S returns the throttle grip 1 back to the original position through the drive gear 5.

Figure 7:
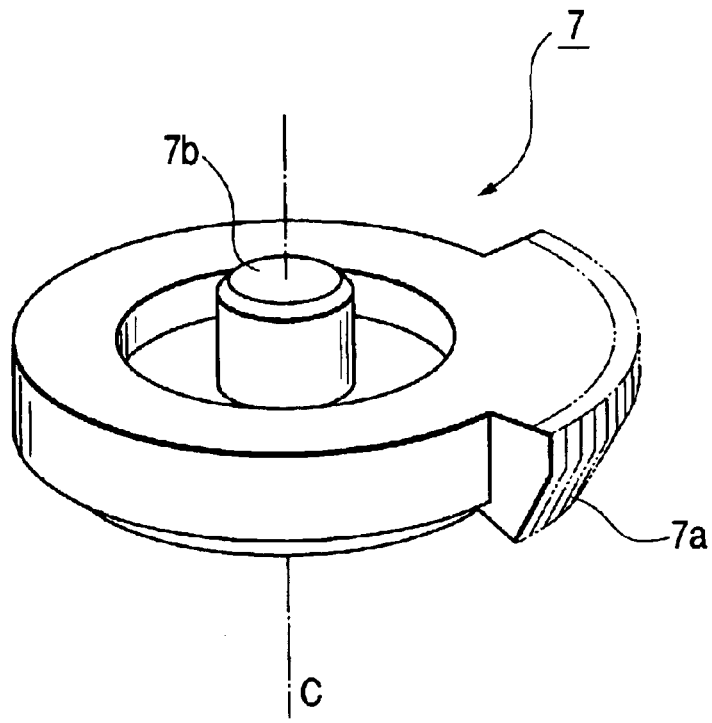
FIG. 7 is a perspective view of a detecting gear used in a throttle-opening detecting apparatus according to the embodiment of the present invention.

The upper surface of the storage member 6 is formed as a flat surface and, on this flat surface, there is disposed a detecting gear 7 so as be rotated. The detecting gear 7, as shown in FIG. 7, includes a substantially disk-shaped member which can be rotated about an axis C which is substantially perpendicular to the extension direction of the handle bar 3 and, in part of the side surface of the detecting gear 7, there is formed a teeth portion (bevel gear) 7a which is inclined by a given angle.

The teeth portion 7a of the detecting gear 7 is disposed so as to be meshingly engaged with the teeth portion 5d of the drive gear 5; and, as the drive gear 5 is rotated, the teeth portion 7a can be rotated about the axis C. That is, in case where the drive gear 5 is rotated together with the throttle grip 1, while the rotation direction of the drive gear 5 is changed to a direction which is substantially perpendicular to the rotative direction of the throttle grip 1 by the bevel gears formed by the teeth portions 5d and 7a, the rotation power is transmitted from the drive gear 5 to the detecting gear 7. By the way, such bevel gears, which are formed by the drive gear 5 and detecting gear 7, constitute rotative direction changing unit according to the present invention.

Also, on the upper surface of the detecting gear 7, there is formed a projecting portion 7b which projects upwardly. The projecting portion 7b is connected to a throttle-opening sensor 8 included a potentiometer, so that the rotation angle of the detecting gear 7 can be detected by the potentiometer.

According to this structure, in case where the throttle grip 1 is rotated, the tube guide 4 and drive gear 5 are rotated and, at the same time, because the rotation direction is changed by the bevel gears, the detecting gear 7 is rotated in a direction substantially perpendicular to the rotation of the drive gear 5. The rotation angle of the detecting gear 7 is detected by the throttle-opening sensor 8 to thereby recognize the rotation angle of the throttle grip 1 (throttle-opening). By the way, a detect signal detected by and issued from the throttle-opening sensor 8 is transmitted through a wire 9 (see FIGS. 1 and 2) to an electronic control unit (not shown) such as an ECU which is carried on board the vehicle; and, in accordance with the operation value of the electronic control unit, the ignition timing of an engine as well as the opening and closing of an exhaust valve can be controlled.

Also, according to the present embodiment, since the detect signal detected and issued by the throttle-opening sensor 8 is transmitted through the electronic control unit to the throttle valve as well to thereby control the opening and closing of the throttle valve, there can be omitted the throttle wire that has been used conventionally. This eliminates not only the need for execution of the mounting operation of the throttle wire and the maintenance thereof but also the inconvenience that has been caused by the poor operation or cutting of the throttle wire.

Figure 10:
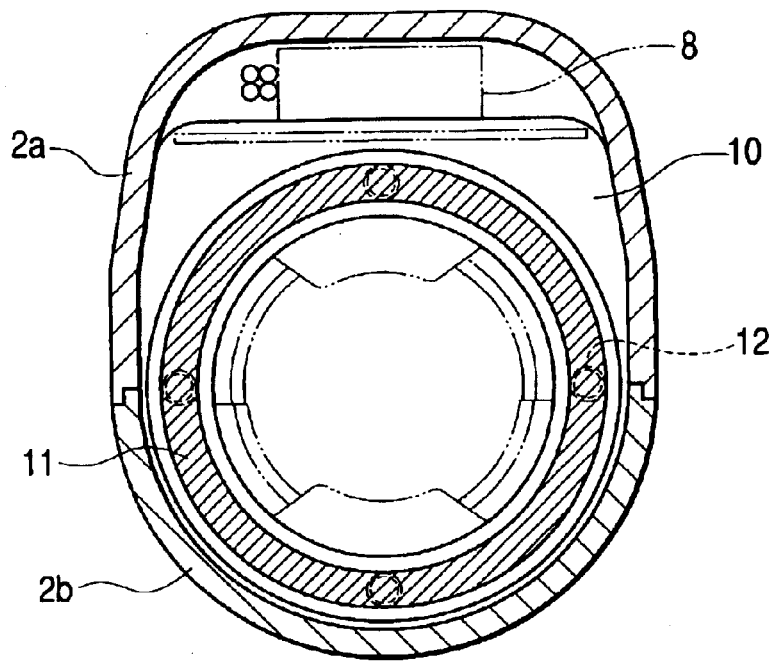

Here, in FIG. 3, reference character 10 designates a plate case which is disposed in the interior of the case 2. In the plate case 10, as shown in FIG. 10, there is disposed a circular-ring-shaped friction plate 11. The plate case 10 includes a circular-ring-shaped groove 10a into which the friction plate 11 can be fitted and, in the groove 10a, there are formed a plurality of holes 10b for storing springs 12 therein.

Thanks to this, the friction plate 11 is fitted into the groove 10 formed in the plate case 10 and is also always urged toward the drive gear 5 by the springs 12, so that the friction plate 11 is able to apply a resisting force based on the friction force thereof to the rotation of the drive gear 5. That is, in case where the throttle grip 1 is rotated to thereby rotate the drive gear 5, there is generated a resisting force in the opposite direction with respect to the rotation of the drive gear 5, which makes it possible to obtain a similar operation feeling to the conventional structure in which the wire is disposed.

By the way, by changing the springs 12 and friction plate 11, there can be obtained an arbitrary resisting force, which allows the driver to become familiar easily with the operation of the throttle grip 1 when rotating the throttle grip 1. The friction plate 11 can be made of any one of general-purpose materials.

According to the above-mentioned throttle-opening detecting apparatus, the detecting gear 7 rotatable with the rotation of the drive gear 5 is rotated in a direction substantially perpendicular to the rotation of the drive gear 5, so that the detecting gear 7 is rotated about an axis C extending substantially perpendicularly to the extension direction of the handle bar 3. Thanks to this, when compared with a structure in which the detecting gear 7 is rotated about an axis extending in parallel to the extension direction of the handle bar 3, the thickness-direction dimension d of the case 2 can be reduced. That is, since the shifting motion of the detecting gear 7 caused by the rotational movement of the detecting gear 7 is carried out in the width direction W of the case 2, the thickness-direction dimension d of the case 2 can be reduced, which makes it possible to reduce the size of the whole throttle-opening detecting apparatus.

Also, because the case 2 includes the two half-divided upper and lower cases 2a and 2b, the efficiency of the operation for mounting the case 2 onto the handle bar 3 can be enhanced. Further, since the throttle-opening sensor 8 is mounted on the upper side of the case 2, even in case where the rainwater or the like penetrates into the case 2, the throttle-opening sensor 8 can be prevented from being immersed in the rainwater, which makes it possible to prevent the malfunction of the throttle-opening detecting apparatus which could otherwise be caused by the possible water penetration.

Although description has been given heretofore of an embodiment according to the present invention, the present invention is not limited to this embodiment but, for example, there can also be employed another embodiment in which the value detected by the throttle-opening sensor is used only to control the ignition timing of the engine and thus the opening and closing of the exhaust valve and the control of the opening and closing of the throttle valve is executed using a throttle wire with its leading end connected to the drive gear. That is, while controlling the opening and closing of the throttle valve using the throttle wire as in the conventional structure, the detecting gear is rotated in a direction perpendicular to the rotation of the drive gear so as to be able to reduce the thickness-direction dimension of the case.

Also, there may be employed a structure in which the lower surface or side surface of the storage member 6 is formed as a flat surface and, not only the detecting gear 7 is disposed on such flat surface of the storage member 6 but also the throttle-opening sensor 8 is connected to such flat surface. Or, instead of the bevel gears that are formed by the drive gear 5 and detecting gear 7, there may be used other rotative direction changing unit which can rotate a detect member (which is not always limited to a gear), the rotation angle of which is to be detected by the throttle-opening sensor 8, in a direction substantially perpendicular to the rotative direction of the throttle grip 1. Further, in the present embodiment, the throttle-opening detecting apparatus is mounted on the handle bar of a two-wheeled vehicle; however, it may also be mounted on other vehicles (such as an ATV and a snowmobile) including a handle bar.

According to the present invention as set forth in the first aspect, since the detect member is rotated by the rotative direction changing unit in the direction substantially perpendicular to the rotative direction of the throttle grip (that is, the detect member is rotated about an axis extending substantially perpendicularly to the extension direction of the handle bar), the shifting motion of the detect member caused by the rotational movement of the detect member is executed in the width direction of the case, thereby being able to decrease the thickness-direction dimension of the case, which in turn can reduce the size of the whole throttle-opening detecting apparatus.

According to the present invention as set forth in the second aspect, since the case includes the two half-divided cases and can be mounted onto the handle bar from above and below, the efficiency of the operation for mounting the throttle-opening detecting apparatus onto the handle bar can be enhanced.

According to the present invention as set forth in the third aspect, because the throttle-opening sensor is mounted on the upper side of the case, even in case where the rainwater or the like penetrates into the case 2, the throttle-opening sensor 8 can be prevented from being immersed in the rainwater, which makes it possible to prevent the malfunction of the throttle-opening detecting apparatus which could be otherwise caused by the possible water penetration.

What is claimed is:

1. A throttle-opening detecting apparatus comprising:
   a case mounted on a handle bar of a vehicle;
   a throttle grip mounted on a leading end side of the handle bar from the case so as to be rotatable with respect to the handle bar;
   a detect member incorporated in the case and rotatable in linking with the throttle grip;
   a throttle-opening sensor incorporated in the case for detecting a rotation angle of the detect member to generate an electric detection signal indicative of a rotation angle of the throttle grip; and
   a rotative direction changing unit for rotating the detect member in a direction substantially perpendicular to a rotative direction of the throttle grip.

2. The throttle-opening detecting apparatus as set forth in claim 1, wherein the case includes two half-divided cases, the two half-divided cases being respectively mounted onto the handle bar from an upper and a lower directions of the apparatus so as to hold the handle bar therebetween.

3. The throttle-opening detecting apparatus as set forth in claim 2, wherein the throttle-opening sensor is mounted on the upper side of the case.

4. The throttle-opening detecting apparatus as set forth in claim 1, wherein the throttle-opening sensor is mounted on an upper side of the case.

* * * * *